(12) United States Patent
Fujimoto et al.

(10) Patent No.: US 6,523,088 B2
(45) Date of Patent: Feb. 18, 2003

(54) DISK ARRAY CONTROLLER WITH CONNECTION PATH FORMED ON CONNECTION REQUEST QUEUE BASIS

(75) Inventors: Kazuhisa Fujimoto, Kodaira (JP); Akira Fujibayashi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/189,238

(22) Filed: Jul. 5, 2002

(65) Prior Publication Data

US 2002/0178327 A1 Nov. 28, 2002

Related U.S. Application Data

(63) Continuation of application No. 09/985,785, filed on Nov. 6, 2001, which is a continuation of application No. 09/756,748, filed on Jan. 10, 2001, now Pat. No. 6,341,332, which is a continuation of application No. 09/334,599, filed on Jun. 17, 1999, now Pat. No. 6,393,519.

(30) Foreign Application Priority Data

Jun. 19, 1998 (JP) .......................................... 10-189957

(51) Int. Cl.$^7$ .............................................. G06F 12/00
(52) U.S. Cl. ........................... 711/114; 711/113; 710/38
(58) Field of Search ............................. 710/36, 37, 38, 710/39, 52; 711/111, 112, 113, 114

(56) References Cited

U.S. PATENT DOCUMENTS

| | | | |
|---|---|---|---|
| 4,476,526 A | 10/1984 | Dodd | 364/200 |
| 5,335,327 A | 8/1994 | Hisano et al. | 395/250 |
| 5,680,580 A | 10/1997 | Beardsley et al. | 395/489 |
| 5,864,738 A | 1/1999 | Kessler et al. | 709/239 |
| 5,890,207 A | 3/1999 | Sne et al. | 711/113 |
| 5,890,219 A | 3/1999 | Scaringella et al. | 711/162 |
| 5,909,691 A | 6/1999 | Schultz et al. | 711/4 |
| 5,951,656 A | 9/1999 | Finnell | 710/52 |
| 6,018,778 A | 1/2000 | Stolowitz | 710/61 |
| 6,029,212 A | 2/2000 | Kessler et al. | 709/213 |
| 6,098,149 A | 8/2000 | Ofer et al. | 711/112 |
| 6,341,332 B2 * | 1/2002 | Fujimoto et al. | 711/113 |
| 6,393,519 B1 * | 5/2002 | Fujimoto et al. | 710/38 |

* cited by examiner

Primary Examiner—Matthew Kim
Assistant Examiner—Christian P. Chace
(74) Attorney, Agent, or Firm—Antonelli, Terry, Stout & Kraus, LLP

(57) ABSTRACT

A disk array controller having a first interface unit to a host computer, a second interface unit to a plurality of disk drives, a cache memory unit for temporarily storing data to be transferred to and from the disk drives, and a selector unit provided between the first and second interface units and the cache memory unit, wherein a plurality of connection requests from the first and second interface units are queued to preferentially process a connection request for a vacant access port the cache memory unit.

1 Claim, 17 Drawing Sheets

ORDER SHIFT

DISK ARRAY CONTROLLER WITH CONNECTION PATH FORMED ON CONNECTION REQUEST QUEUE BASIS

CROSS-REFERENCE TO RELATED APPLICATION

This is a continuation of application Ser. No. 09/985,785, Nov. 6, 2001; which is a continuation of Ser. No. 09/756,748, Jan. 10, 2001, now U.S. Pat. No. 6,341,332; which is a continuation of application Ser. No. 09/334,599, filed Jun. 17, 1999, now U.S. Pat. No. 6,393,519.

BACKGROUND OF THE INVENTION

The present invention relates to a controller for controlling, a disk array which divides data and stores the data in a plurality of disk drives.

As compared to an I/O performance of a main storage of a computer, an I/O performance of a sub-system using a magnetic disk as a secondary storage has a processing ability inferior by about three to four digits. Reducing this difference, i.e., improving the I/O performance of the sub-system has been tried in various ways.

As one method of improving the I/O performance of a sub-system, a sub-system has been proposed which is constituted of a plurality of disk drives and data is divisionally stored in the disk drives, i.e., a so-called disk array system is known.

For example, according to one conventional technique (hereinafter called a first conventional technique), as shown in FIG. 2, a disk array system is constituted of: a plurality of channel I/F units 111 for executing data transfer between a host computer 101 and a disk array controller 2; a plurality of disk I/F units 112 for executing data transfer between disk drives 120 and the disk array controller 2; cache memory units 115 for temporarily storing data of the disk drives 120; and shared memory units 114 for storing control information on the data in the disk drives 120 and on the disk array controller 2, wherein the cache memory units 115 and shared memory units 114 can be accessed from all of channel I/F units 111 and disk I/F units 112.

According to the first conventional technique, the channel I/F units 111 and disk units I/F units 112 are connected to the shared memory units 114 in one-to-one correspondence, and the channel I/F units 111 and disk units I/F units 112 are also connected to the cache memory units 114 in one-to-one correspondence.

According to another conventional technique (hereinafter called a second conventional technique), as shown in FIG. 3, a disk array system is constituted of: a plurality of channel I/F units 111 for executing data transfer between a host computer 101 and a disk array controller 3; a plurality of disk I/F units 112 for executing data transfer between disk drives 120 and the disk array controller 3; cache memory units 115 for temporarily storing data of the disk drives 120; and shared memory units 114 for storing control information on the data in the disk drives 120 and on the disk array controller 3.

The channel I/F units 111 and disk I/F units 112 are connected to the shared memory units 114 via a shared bus 130, and to the cache memory units 115 via a shared bus 131.

Request for high performance of a disk array system has been dealt with by using a large scale disk array controller and high speed components, e.g., by an increase in the number of processors and in the cache capacity, use of high performance processors, expansion of an internal bus width, improvement on a bus transfer ability and the like.

With the second conventional techniques, however, it is becoming difficult for the transfer ability of an internal bus to follow a large scale system and performance improvement.

In order to achieve a high memory access performance by improving the internal bus performance, it is conceivable that one-to-one correspondence between processors and memories similar to the first conventional technique is preferable.

With this method, the internal bus performance improves proportionally to the number of access paths connected to the memories.

However, the number of access paths connected to shared memories and cache memories increases in proportion to an increase in the number of processors used in the system.

In order to maximize the internal bus performance, it is necessary to efficiently control the accesses between each processor and each memory.

SUMMARY OF THE INVENTION

It is an object of the present invention to solve the above-described problem and provide a disk array controller capable of efficiently using access paths between processors and memories and having a high memory access throughput, particularly a high cache memory access throughput.

In order to achieve the above object of the invention, a disk array controller is provided which comprises: one or more interface units to a host computer; one or more interface units to a plurality of disk drives; and one or more physically independent shared memory units for storing control information on data in the disk drives and on the disk array controller, wherein the interface units to the host computer and the interface units to the disk drives can access the shared memory units via a selector, and access paths are connected between the selector and the interface units to the host computer and to the disk drives and between the selector and the shared memory units, and wherein the selector unit includes:

a unit for connecting a plurality of input ports (access paths) from the interface units to the host computer and to the disk drives to a plurality of output ports (access paths) to the shared memory units;

a unit for storing connection requests from input ports to output ports in an arrival order of the connection requests; and an arbiter unit for arbitrating a plurality of connection requests and assigning an output port to a connection request from an input port.

The arbiter unit assigns, if a top connection request among the connection requests stored in the arrival order is a connection request to a vacant output port, the output port to the connection request; checks a second connection request, if the top connection request among the connection requests stored in the arrival order is a connection request to an occupied output port, and assigns, if the second connection request is a connection request to a vacant output port, the output port to the second connection request; checks a third connection request, if the second connection request is a connection request to an occupied output port, and thereafter repeats an arbitration (assignment) of an output port to a connection request at the most by several times equal to the number of vacant output ports.

In this invention, the shared memory unit includes physically independent and duplicated first and second shared memory units, and the selector accesses both of the first and second shared memory units at the same time.

Also in this invention, the shared memory unit includes a cache memory unit and a shared memory unit both physically divided, the cache memory unit temporarily storing data of the disk drives, and the shared memory unit storing control information on the cache memory unit and the disk array controller;

the selector unit includes first and second selectors both physically independent, the first selector connecting the cache memory unit, and the second selector connecting the shared memory unit;

the disk array controller includes physically independent access paths between the interface units to the host computer and to the disk drives and the cache memory unit or the shared memory unit; and at least the first selector includes the arbitor unit.

Also in this invention, the shared memory unit includes physically independent and duplicated shared memory units, the shared memory unit includes physically independent and duplicated shared memory units, and at least the selector accesses both the duplicated shared memory units at the same time and is provided with the arbitor unit.

Also in this invention, when the interface units to the host computer or to the disk drives access the shared memory unit or cache memory unit, an address and a command are sequentially transferred, and then after an access path to the shared memory unit or cache memory unit is established, data is transferred.

According to the invention, the selector unit disposed between the interface units to the host computer and to the disk drives and the shared memory units can efficiently distribute access requests from the interface units to the shared memory unit. It is therefore possible to improve throughput of data transfer of the disk array controller.

DETAILED DESCRIPTION OF THE EMBODIMENTS

Embodiments of the invention will be described in detail hereinunder.

Figure 1:
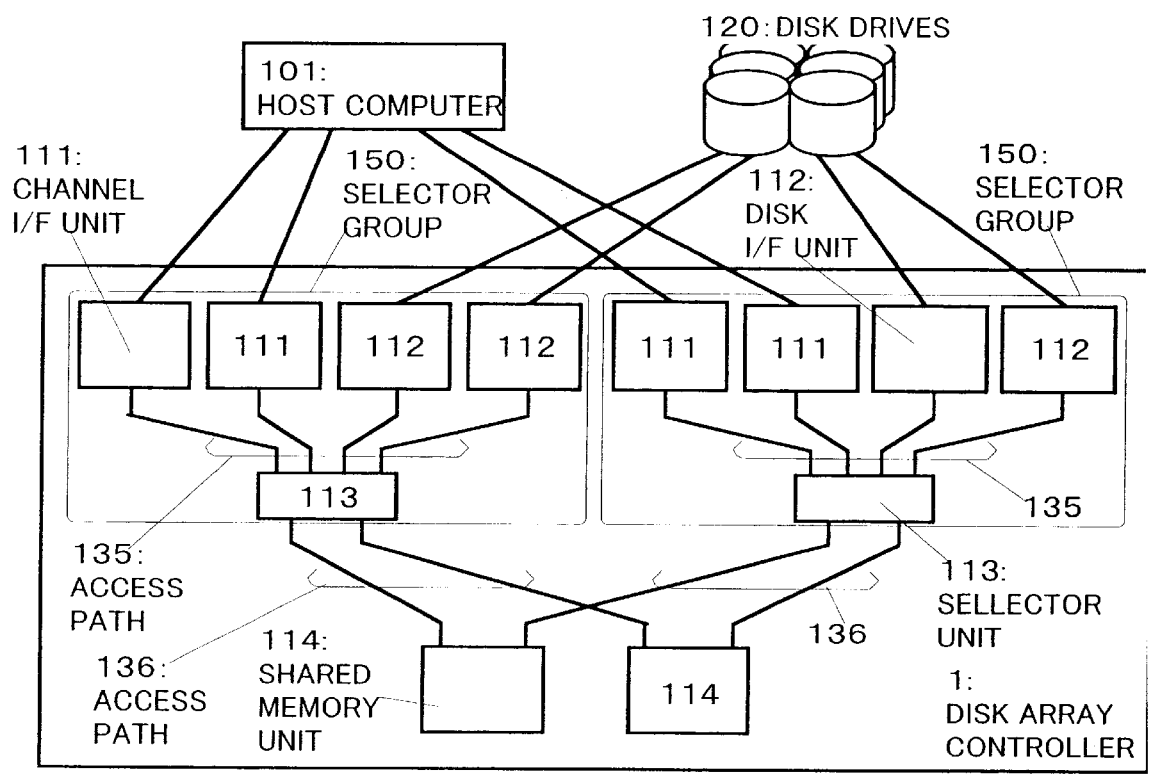
FIG. 1 is a block diagram showing the structure of a disk array controller of this invention.
Figure 2:
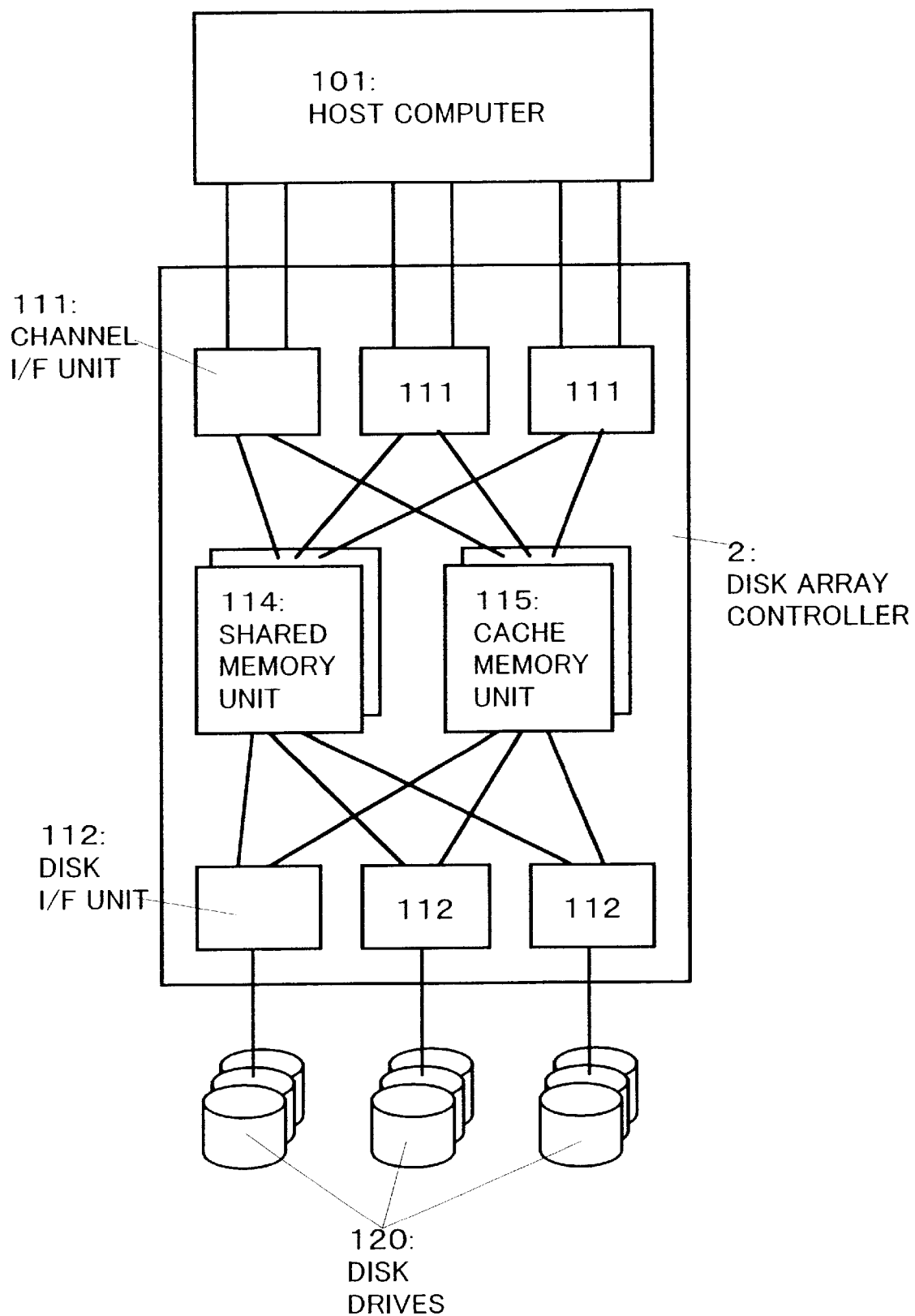
FIG. 2 is a block diagram showing the structure of a conventional disk array controller.
Figure 3:
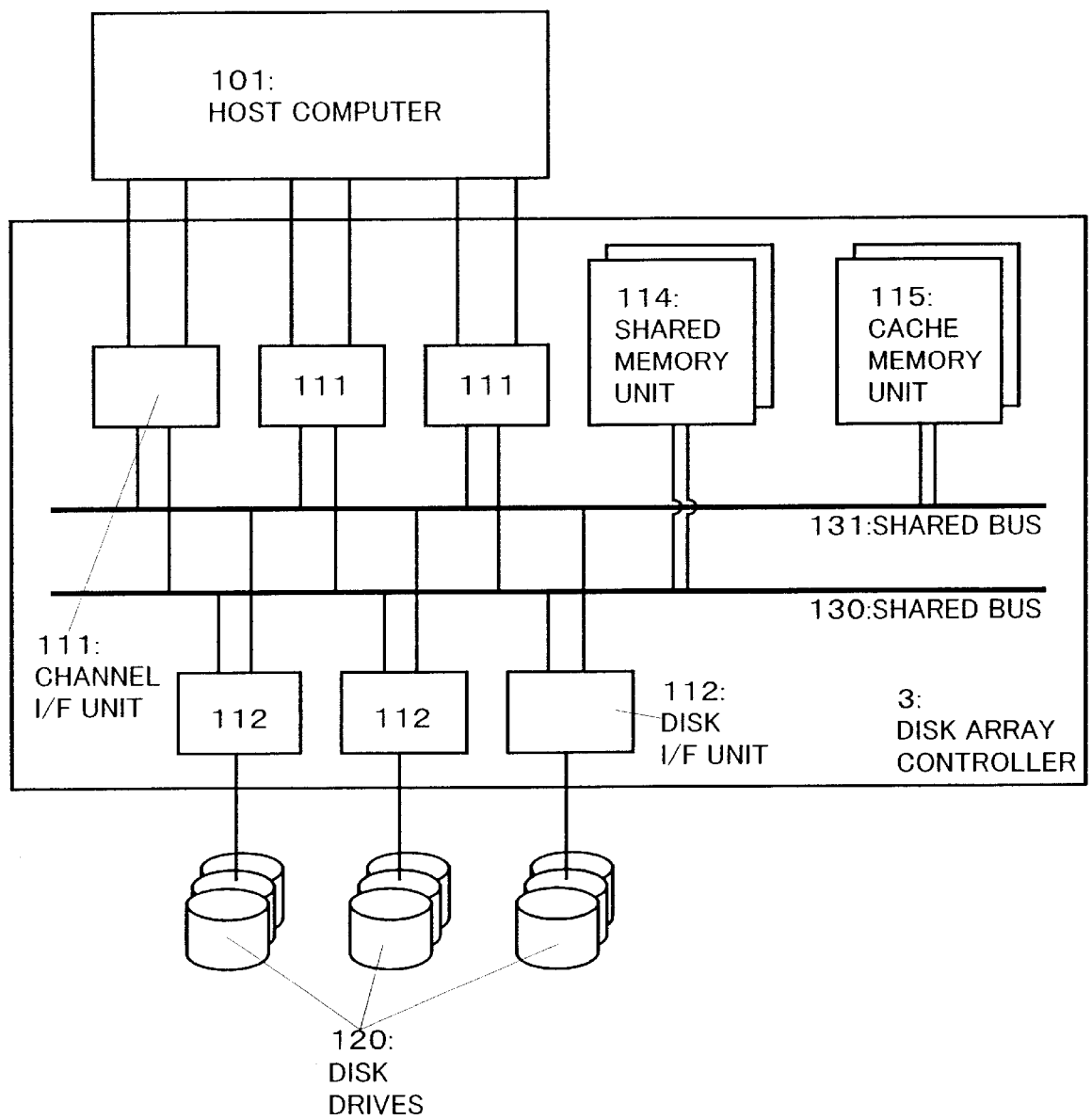
FIG. 3 is a block diagram showing the structure of another conventional disk array controller.

FIG. 1 shows a first embodiment of the invention.

A disk array controller 1 is constituted of channel I/F units 111, disk I/F units 112, selector units 113, shared memory units 114, and access paths 135 and 136.

An access path is constituted of data lines and control lines. Control signals such as a connection request (REQ) and acknowledgement (ACK) are transferred over the control lines.

Figure 13:
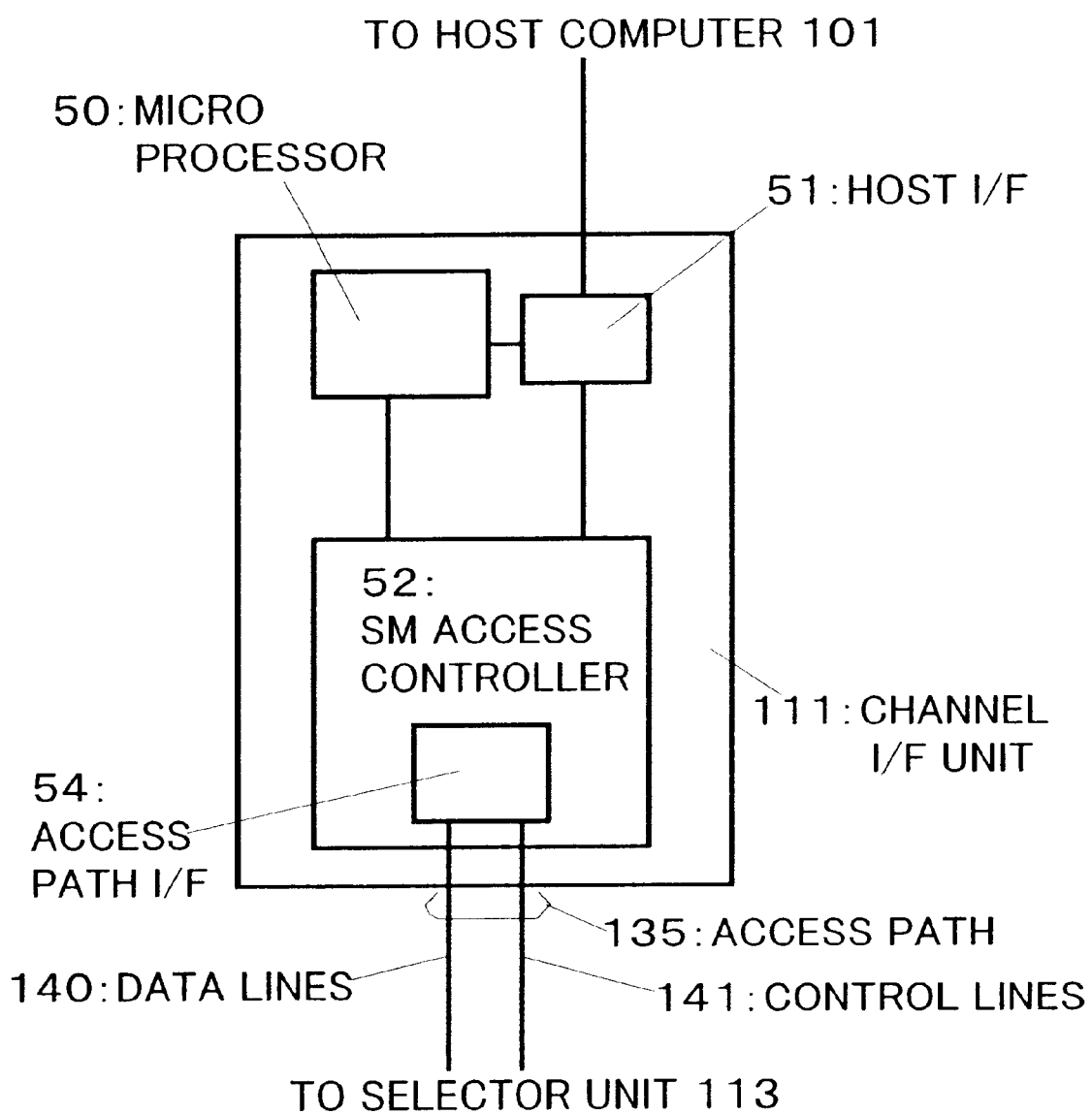
FIG. 13 is a block diagram showing the structure of a channel I/F unit.
Figure 14:
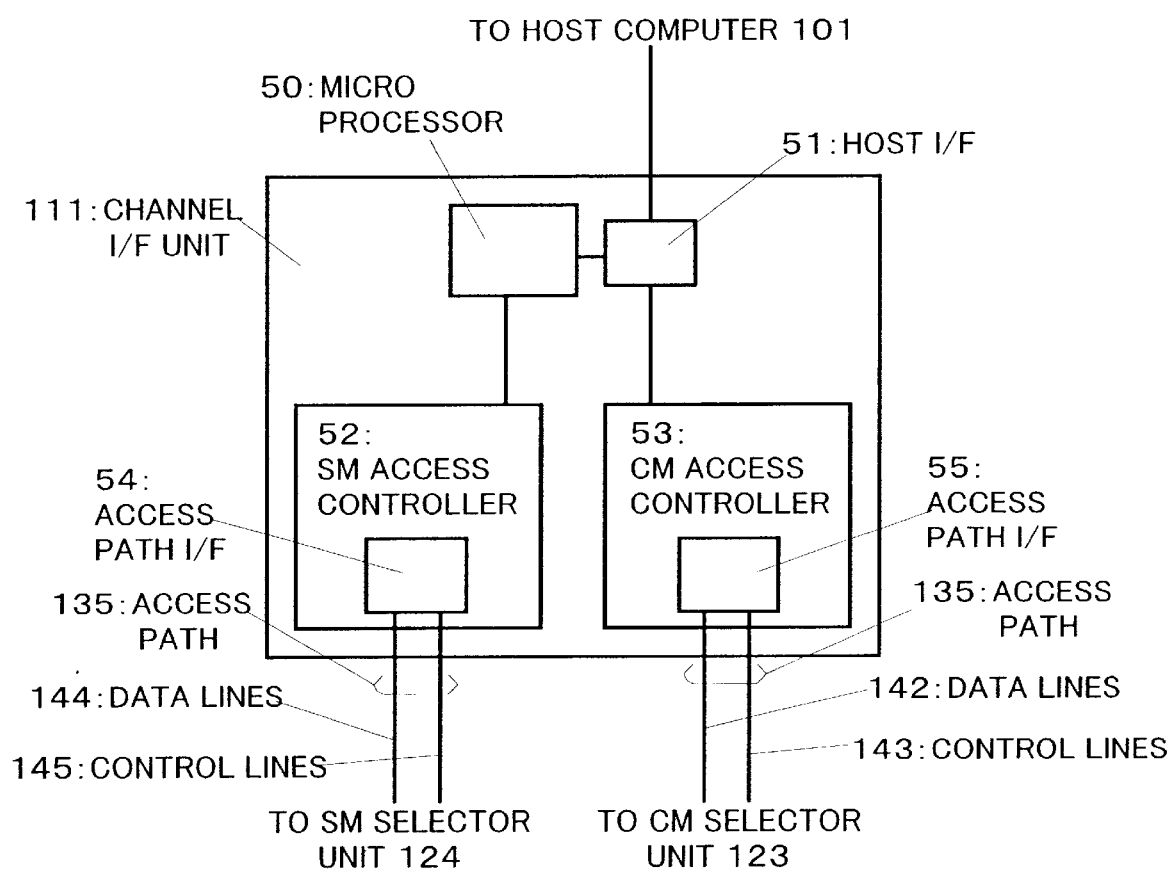
FIG. 14 is a block diagram showing the structure of the channel I/F units shown in FIGS. 10 and 11 of the disk array controller of the invention.

As shown in FIG. 13, the channel I/F unit 111 is constituted of one I/F (host I/F) 51 to the host computer, one micro processor 50, and one shared memory access controller (SM access controller) 52 including one access path I/F 54 to the shared memory units 114.

For the data write, the host I/F 51 divides data supplied from the host computer 101 into packets and sends them to the SM access controller 52. The SM access controller sends a plurality of packets supplied from the host I/F 51 to the shared memory unit 114 via the selector unit 113 by using one access path.

For the data read, the SM access controller 52 sends a plurality of packets supplied from the shared memory unit 114 to the host I/F 51. The host I/F 51 generates one set of data from a plurality of packets supplied from the SM access controller 52 and sends it to the host computer 101.

The micro processor 50 controls data transmission/reception at the host I/F 51 and SM access controller 52.

The disk I/F unit 112 is basically the same as the channel I/F unit 111 shown in FIG. 13, and is constituted of one I/F (drive I/F) to a plurality of disk drives 120, one micro processor, and one shared memory access controller (SM access controller) including one access path I/F to the shared memory units 114. In this structure, the host I/F 51 shown in FIG. 13 is replaced by the drive I/F. For the data read/write, a process at least similar to the process described for the channel I/F unit 111 is executed.

The numbers of devices described above are only illustrative and are not limited thereto.

The shared memory unit 114 stores data to be written in the disk drive 120 and management information such as management information of the data and system information.

The selector unit 113 is connected to four access paths 135 to two channel I/F units 111 and two disk I/F units 112.

The selector unit 113 is also connected to two access paths to the two shared memory units 114.

One selector unit 113 and the two channel I/F units 111 and two disk I/F units 112 connected to the selector unit 113 constitute one group which is called a selector group.

In this embodiment, the disk array controller 1 has two selector groups 150. The number above mentioned is only illustrative and is not limited thereto.

The number of access paths between the channel and disk I/F units and the selector unit and the number of access paths between the selector unit and the shared memory units have the relation described above. Therefore, the selector unit 113 selects only two requests corresponding to the number of access paths 136 to the shared memory units 114, from the requests issued from the channel and disk I/F units 111 and 112 via the four access paths 135, and processes the selected two requests.

The number of access paths connected between one selector unit 113 and the shared memory units 114 is set smaller than the number of access paths connected between the channel and disk I/F units 111 and 112 and the selector unit 113, and the number of selector units 113 is set smaller than the total number of channel and disk I/F units 111 and 112, as described above. It is therefore possible to reduce the number of access paths connected to the shared memory units 114.

With this setting, the problems of an LSI pin neck and a package connector neck of the shared memory unit can be solved.

More specifically, one access path is constituted of several tens signal lines so that if signal lines are directly connected between the I/F units and shared memory units, the number of signal lines becomes enormously. Therefore, such connection is impossible by using one LSI package. This is called a LSI pin connection neck.

Similarly, the number of pins of an input/output connector between the shared memory units and the channel and disk I/F units becomes enormously. It is therefore very difficult to increase the number of pins of the connector to such an enormous number. This is called a LSI pin neck.

The invention can solve such problems.

Next, the internal structure of the selector unit 113 will be described.

Figure 4:
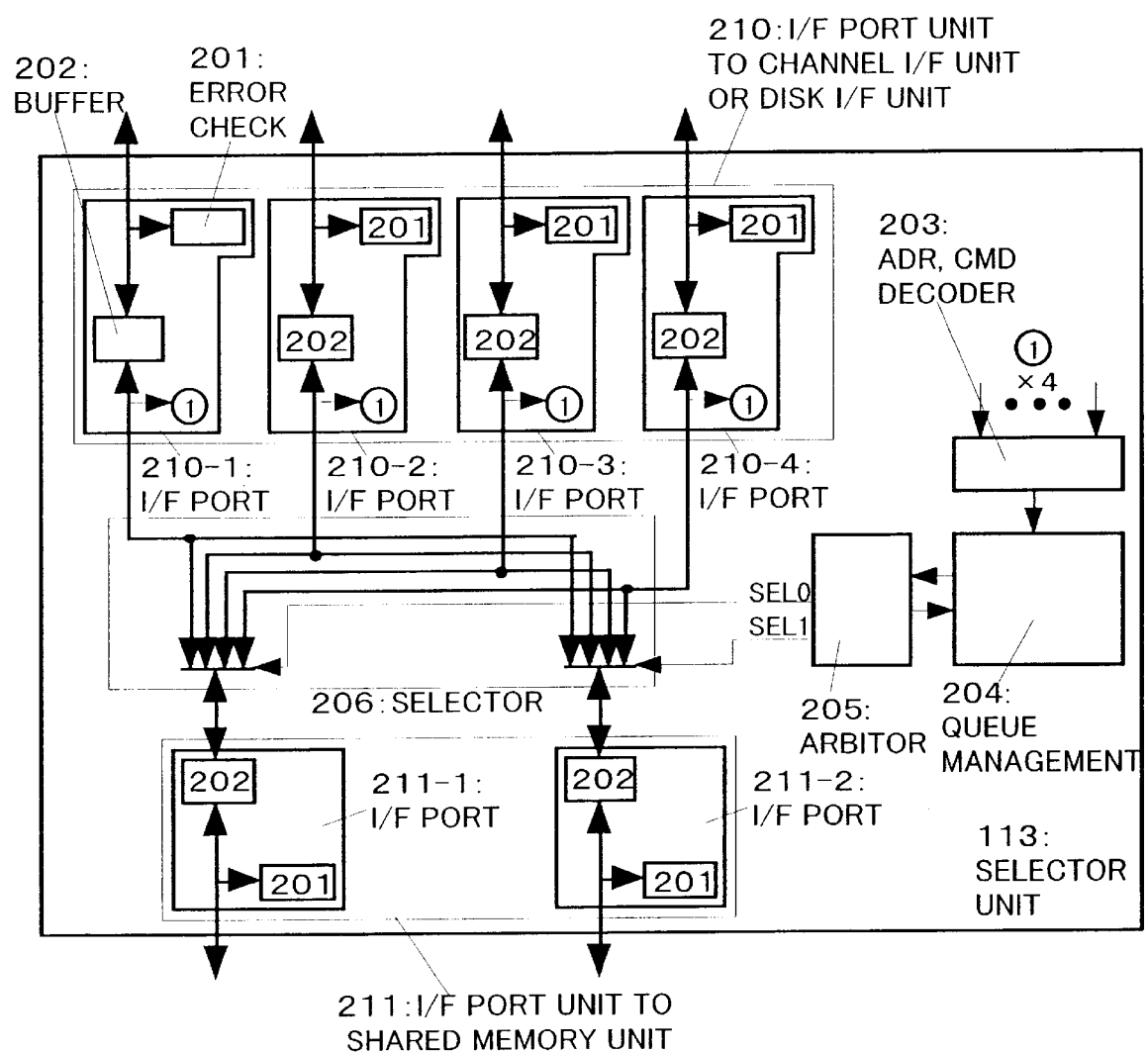
FIG. 4 is a block diagram showing the structure of a selector unit of the disk array controller of the invention.

FIG. 4 shows the internal structure of the selector unit 113.

The selector unit 113 has: an I/F port unit 210 to the channel I/F units 111 and disk I/F units 112; an I/F port unit 211 to the shared memory units 114; a selector 206 for the connection between the I/F port units 210 and 211; error check units 201 for checking input/output data at the I/F port units 210 and 211; buffers 202 for buffering addresses, commands and data supplied from the channel and disk I/F units 111 and 112; an address/command (ADR/CMD) decoder 203 for decoding addresses and commands supplied from the channel and disk I/F units 111 and 112; a queue management unit 204 for managing decoded results in an arrival order, as connection requests to the I/F port unit 211; and an arbitor unit 205 for executing arbitration in accordance with the connection requests registered in the queue management unit 204 and determining a connection privilege to the I/F port unit 211.

The LSI pin neck and package connector neck of the shared memory unit can be solved, as described above, by setting the number of ports of the I/F port unit 210 smaller than the number of ports of the I/F port unit 211.

In this embodiment, the number of ports of the I/F port unit 210 is set to "4" and the number of ports of the I/F port unit 211 is set to "2".

Figure 12:
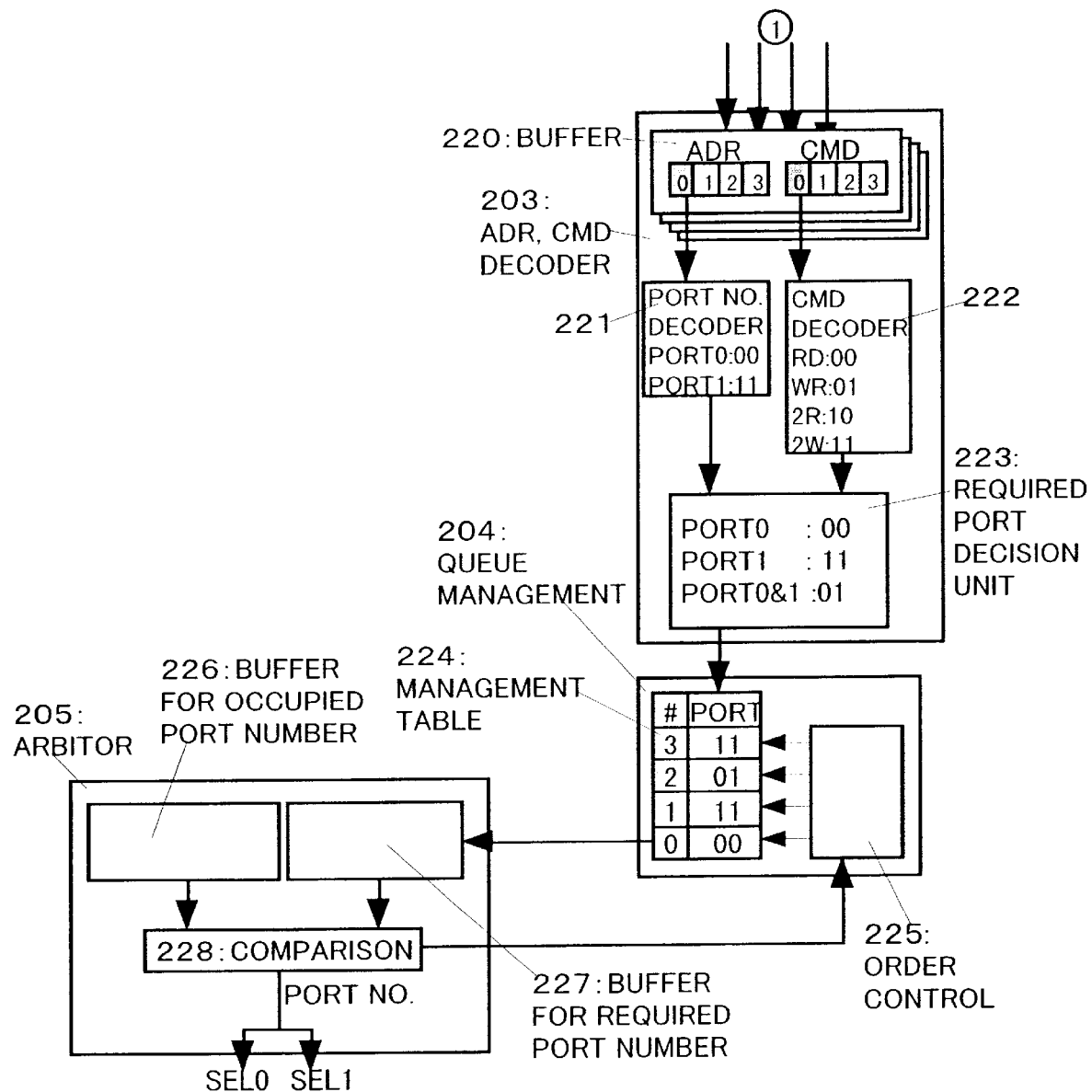
FIG. 12 is a diagram showing the details of the selector unit of the disk array controller of the invention.

FIG. 12 shows the detailed structures of the address/command (ADR/CMD) decoder 203, queue management unit 204 and arbitor unit 205.

The address/command (ADR/CMD) decoder 203 has four buffers 220 corresponding in number to the number of ports of the I/F port unit 210 to the channel and disk I/F units 111 and 112, and stores commands (CMD) and addresses (ADR) supplied from I/F ports 210-1 to 210-4.

Each address has a length of four bytes, and the first one byte indicates an output port number (port No.). Each command has a length of four bytes, and the first one byte indicates an access type (read: RD, write: WR, duplicate read: 2R, duplicate write: 2W). If the shared memory unit 114 is duplicated, duplicate read and duplicate write are executed in some cases. Such duplicate access uses two ports at the same time. It is therefore necessary to acquire use privilege of two ports.

A port number decoder 221 derives a requested port number from an address. In this embodiment, a port 0 is assigned "00" and a port 1 is assigned "11". A command decoder 222 derives an access type from a command. In this embodiment, RD is assigned "00", WR is assigned "01", 2R is assigned "10", and 2W is assigned "11". A required port decision unit 223 outputs the port number itself if the access type is not a duplicate access, and outputs "01" if it is a duplicate access.

A queue management unit 204 registers the port numbers output from the address/command (ADR/CMD) decoder 203 in the arrival order in a management table 224, this operation being called queuing. The arbitor unit 205 picks up one port number from the top of the management table 224 and stores it in a buffer 227. A comparison unit 228 compares an occupied port number in a buffer 226 with the required port number in the buffer 227.

If both the port numbers are different, the required port number is output to a selector 206 as selector switch signals SEL0 and SEL1, and an order control unit 225 of the queue management unit 204 is instructed to advance (shifts) the queue order by "1". If the port numbers are equal, the order control unit 225 is instructed to exchange the queue order. An arbitration method, an order exchange method, and a queue order shift method will be described later at the arbitration flow shown in FIG. 6 by using specific examples.

The lengths of an address and a command, the locations of the port number and command type in an address and command, assignment of bits to the port number and command type, described above, are only illustrative and are not limited thereto. If the shared memory unit 114 is not duplicated, a duplicate access does not occur so that the command decoder 222 and required port decision unit 223 are not necessary. In this case, an output of the port number decoder 221 is directly input to the queue management unit 204.

Next, processes to be executed by the selector unit 113 will be described.

Figure 5:
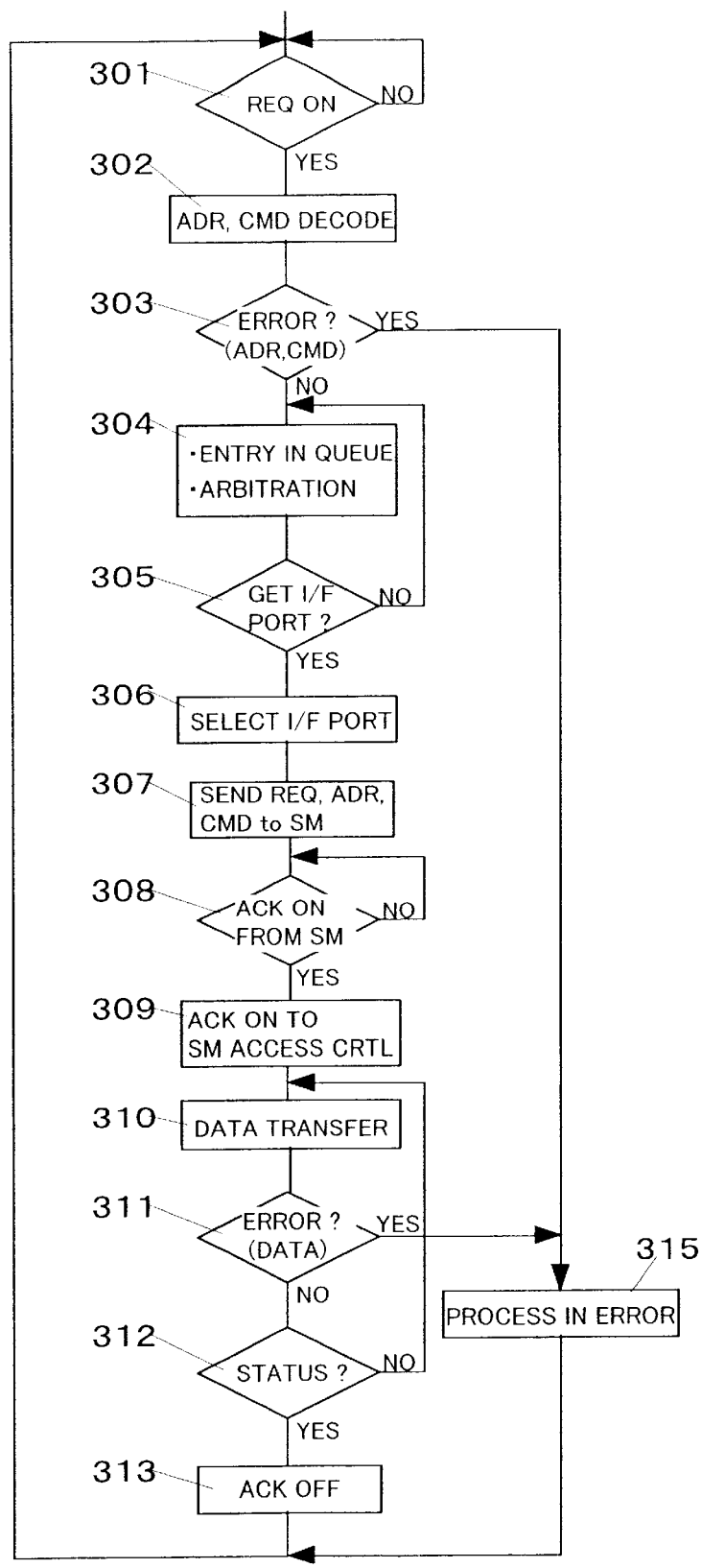
FIG. 5 is a flow chart illustrating the operation to be executed by the selector unit.

FIG. 5 is a flow chart illustrating the operation to be executed by the selector unit 113 when an access is requested to one port of the I/F port unit 210 from the channel and disk I/F units 111 and 112.

First, at Step 301 the process waits for an access request (REQ ON) to be issued from the SM access controller in the channel I/F unit 111 or disk I/F unit 112.

When an access request is received, an address (ADR) and a command (CMD) are decoded at Step 302.

At Step 303, it is checked whether there is any error in the address (ADR) and command (CMD). If there is an error, an error process is executed at Step 315 to thereafter return to Step 301 and enter the access request stand-by state.

If there is no error, the decoded results are queued at Step 304 as a connection request to the I/F port (211-1, 211-2) to the shared memory units 114.

Arbitration is performed in accordance with the queue contents.

At Step 305 the process stands by until the requested port of the I/F port unit 211 to the shared memory unit 114 is acquired.

If acquired, the selector unit 206 is switched at Step 306 to connect one requested port of the I/F port unit 210 to the acquired one port of the I/F port unit 211.

Next, at Step 307, an access request (REQ ON) is issued to the shared memory (SM) unit 114 and an address (ADR) and a command (CMD) are transferred.

At Step 308 the process stands by until an access acknowledgement (ACK ON) is returned from the shared memory unit 114.

When the access acknowledgement (ACK ON) is received, at Step 309 the access acknowledgement (ACK ON) is returned to the SM access controller of the channel I/F unit 111 or disk I/F unit 112.

At Step 310, in the case of data write, data supplied from the SM access controller is transmitted to the shared memory unit 114.

In the case of data read, data supplied from the shared memory unit 114 is transmitted to the SM access controller.

In the data read/write, an error is checked at Step 311.

If an error is found, an error process is executed at Step 315 to thereafter return to Step 301 and enter the access request stand-by state.

If there is no error, it is checked at Step 312 whether a STATUS indicating the contents of data processing is received, and data is transmitted until the STATUS is received.

If the STATUS is received, at Step 313 the shared memory unit is instructed to withdraw the access acknowledgement (ACK OFF) to thereafter return to Step 301 and enter the access request stand-by state.

Figure 6:
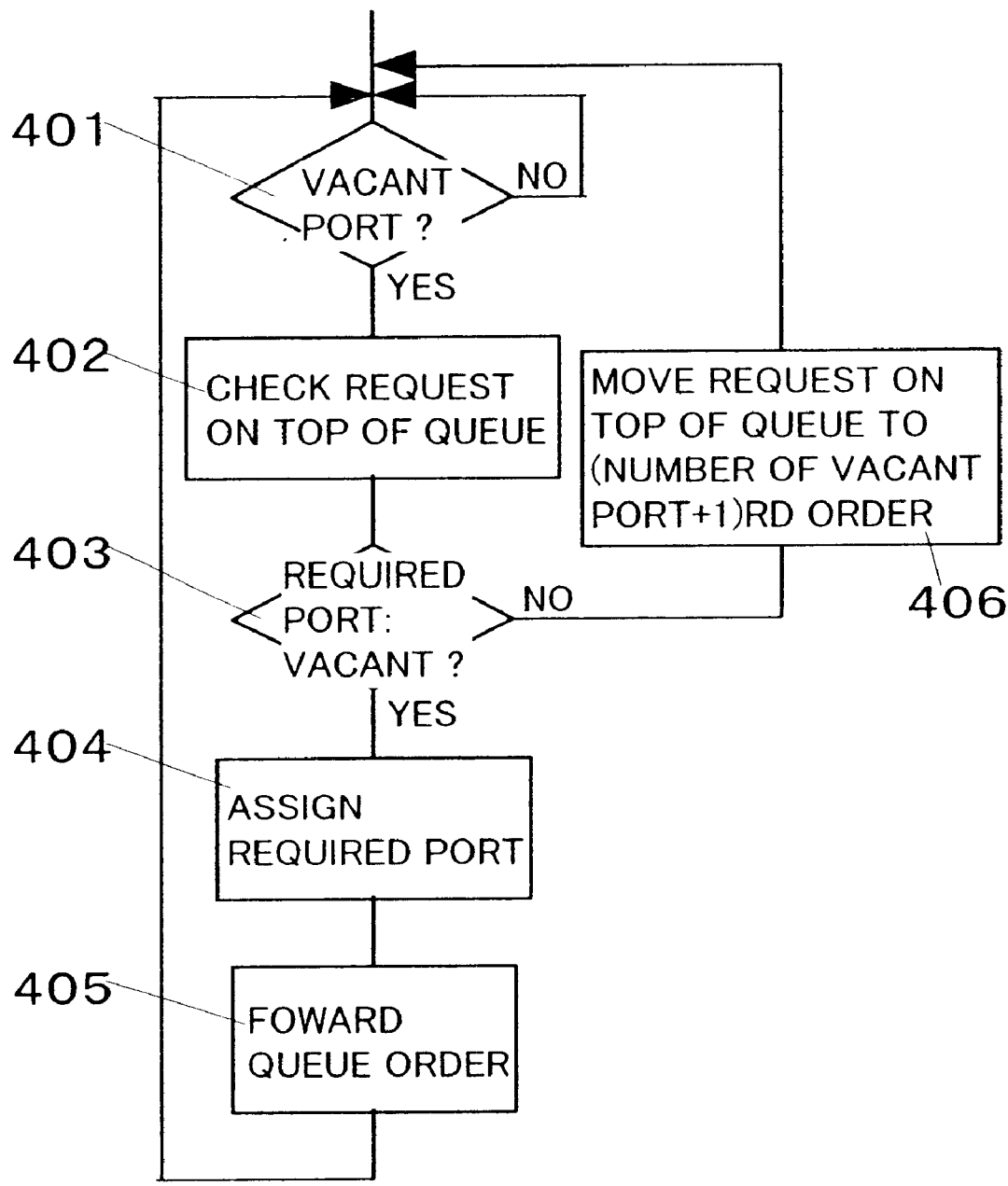
FIG. 6 is a flow chart illustrating the operation to be executed by an arbitor of the selector unit.

Next, an arbitration method to be performed at Step 304 will be described. FIG. 6 is a flow chart illustrating an arbitration operation.

At Step 401 it is checked whether there is a vacant port, and if not, the process stands by until a vacant port appears.

Figure 15A:
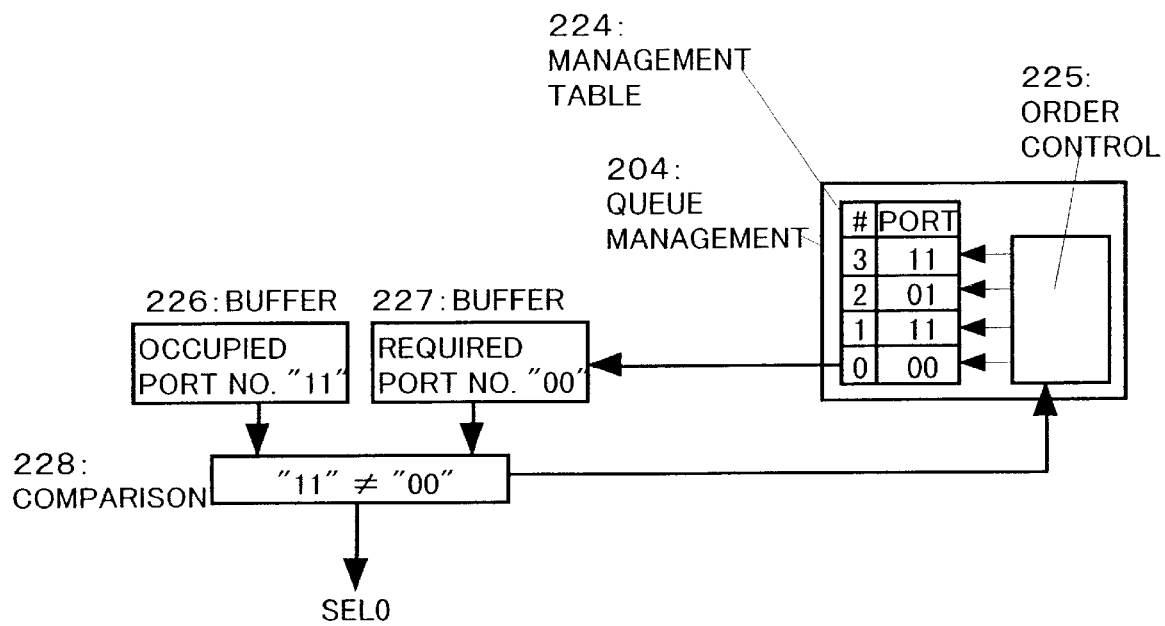
FIGS. 15A and 15B are diagrams illustrating the operation at Step 403 when a request for a vacant output port is issued.

If there is a vacant port at Step 401, the top connection request among the connection requests stored in an arrival order in the management table 224 of the queue management unit 402 is checked at Step 402. More specifically, as shown in FIG. 15A, the port number #0 of "00" in the management table 224 is output to the buffer 227. The comparison unit 228 compares the port number "00" with the occupied port number "11" registered in the buffer 226.

Figure 15B:
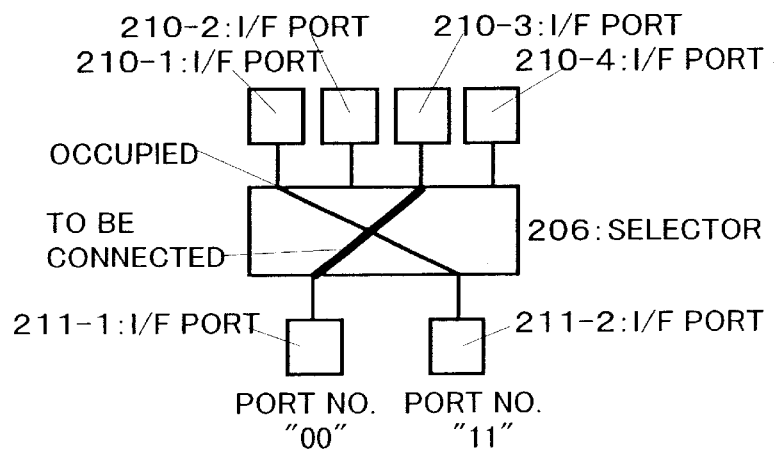

If it is judged at Step 403 that the connection request is issued to a vacant output port, then the output port is assigned to the request at Step 404. Namely, as shown in the example of FIG. 15A, if the required port number "00" is not the occupied port number "11", the switch signal SEL0 is output to connect the IF port 210-3 to the IF port 211-1 (port number "00"). The path formation of this example in the selector unit 206 is shown in FIG. 15B.

Figure 16A:
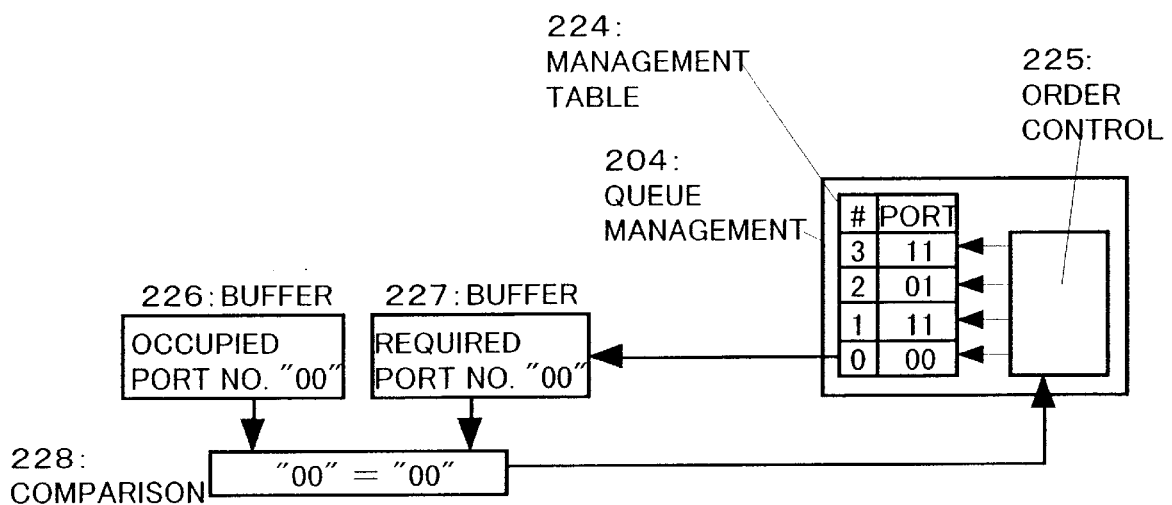
FIGS. 16A and 16B are diagrams illustrating the operation at Step 403 when a request for an occupied output port is issued.
Figure 16B:
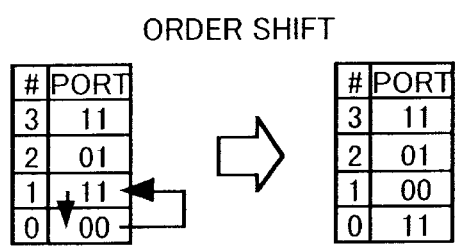

If it is judged at Step 403 that the top connection request among the connection requests stored in the arrival order in the management table 224 of the queue management unit 204 is a request for an occupied output port, the top queue request is shifted to the (number of vacant ports+1)-th order at Step 406 and thereafter the flow returns to Step 401. More specifically, as shown in an example of FIG. 16A, if the required port number "00" is the occupied port number "00", then as shown in FIG. 16B the port number #0 of "00" in the management table 224 is registered in the port number #1 and the port number #1 of "01" is shifted to the port number #0 (the port number #0 of "00" is set to the (number of vacant ports ("1")+1=2)-th order, and thereafter the flow returns to Step 401.

Figure 17:
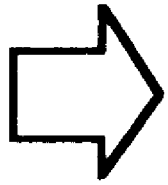
FIG. 17 is a diagram illustrating the operation at Step 405.

If it is judged at Step 403 that the requested port is a vacant port and an output port is assigned at Step 404, the queue order is advanced by "1" to thereafter return to Step 401. Namely, as shown in FIG. 17, the port number #0 of "00" in the management table 224 is discarded, the port number #1 of "11" is shifted to the port number #0, the port number #2 of "01" is shifted to the port number #1, the port number #3 of "11" is shifted to the port number #2, and a new required port number "11" is registered in the port number #3.

The above-described output port assignment is repeated several times equal to the number of vacant ports. If there is no vacant port, the process stands by at Step 401 until a vacant port appears.

By effecting the above mentioned control only when the data to be recorded to the magnetic disk device 120 to which a high throughput is required is transmitted, it becomes possible to prevent a bad influence from affecting to a transmission of control information to which a short access time is required.

With the above control, it becomes possible to efficiently assign the I/F ports (211-1, 211-2) to the shared memory units and realize data transfer of high throughput.

Figure 9:
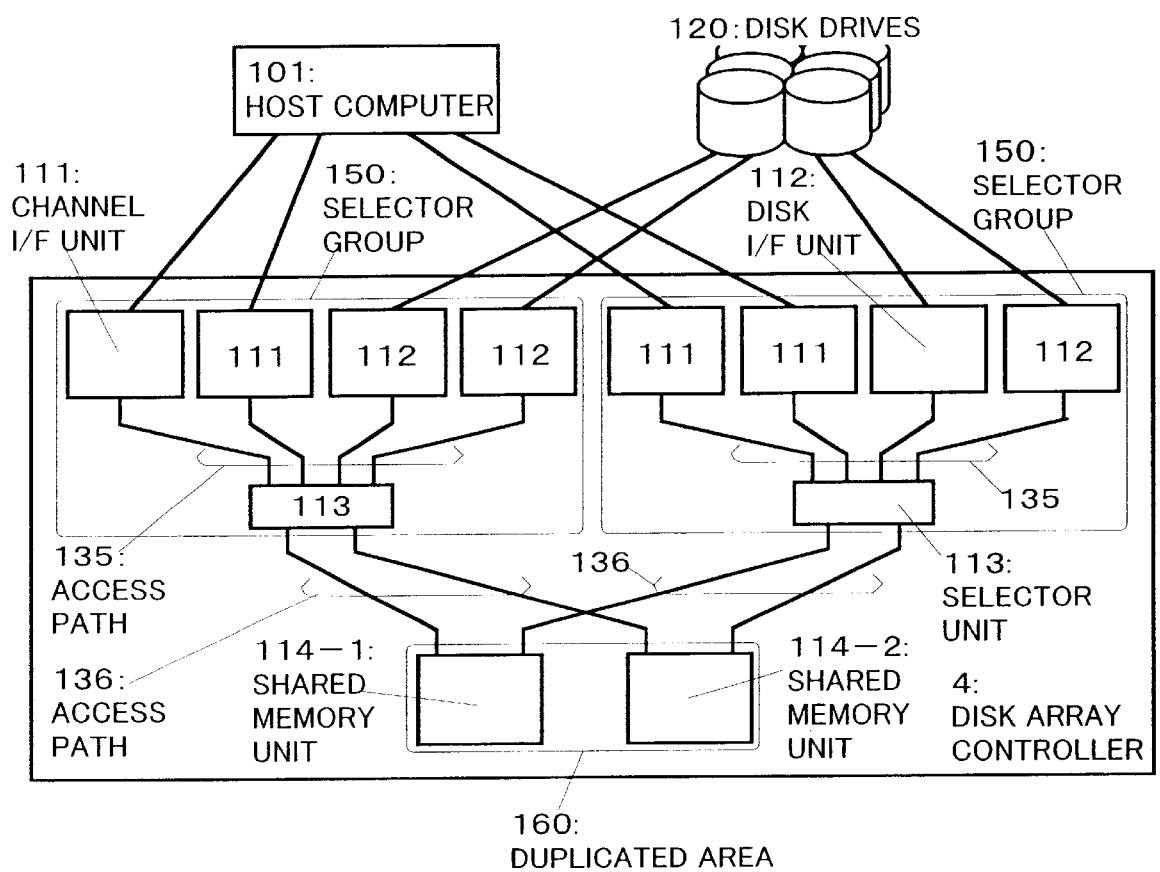
FIG. 9 is a block diagram showing the structure of another disk array controller of the invention.

In another embodiment, as shown in FIG. 9, the shared memory unit 114 may be duplicated by using physically independent shared memory units 114-1 and 114-2 to form a duplicated area 160. More specifically, the same data is written in each of the duplicate shared memory units 114-1 and 114-2. The shared memory unit may be duplicated wholly or partially.

In a disk array controller 4 in which accesses (a duplicate access) from the selector unit 113 to the duplicate shared memory units 114-1 and 114-2 are generated at the same time, it is checked at Steps 402 and 403 shown in FIG. 6 whether an access is a duplicate access. In the case of a duplicate access, if required two ports are vacant, these ports are assigned, whereas if not, the control advances to Step 406.

In this manner, reliability of data stored in the shared memory units 114-1 and 114-2 can be improved.

It is also possible to efficiently assign the I/F ports 211-1 and 211-2 to the shared memory units 114-1 and 114-2 when data to be written in the disk drives 120 is transferred.

Figure 10:
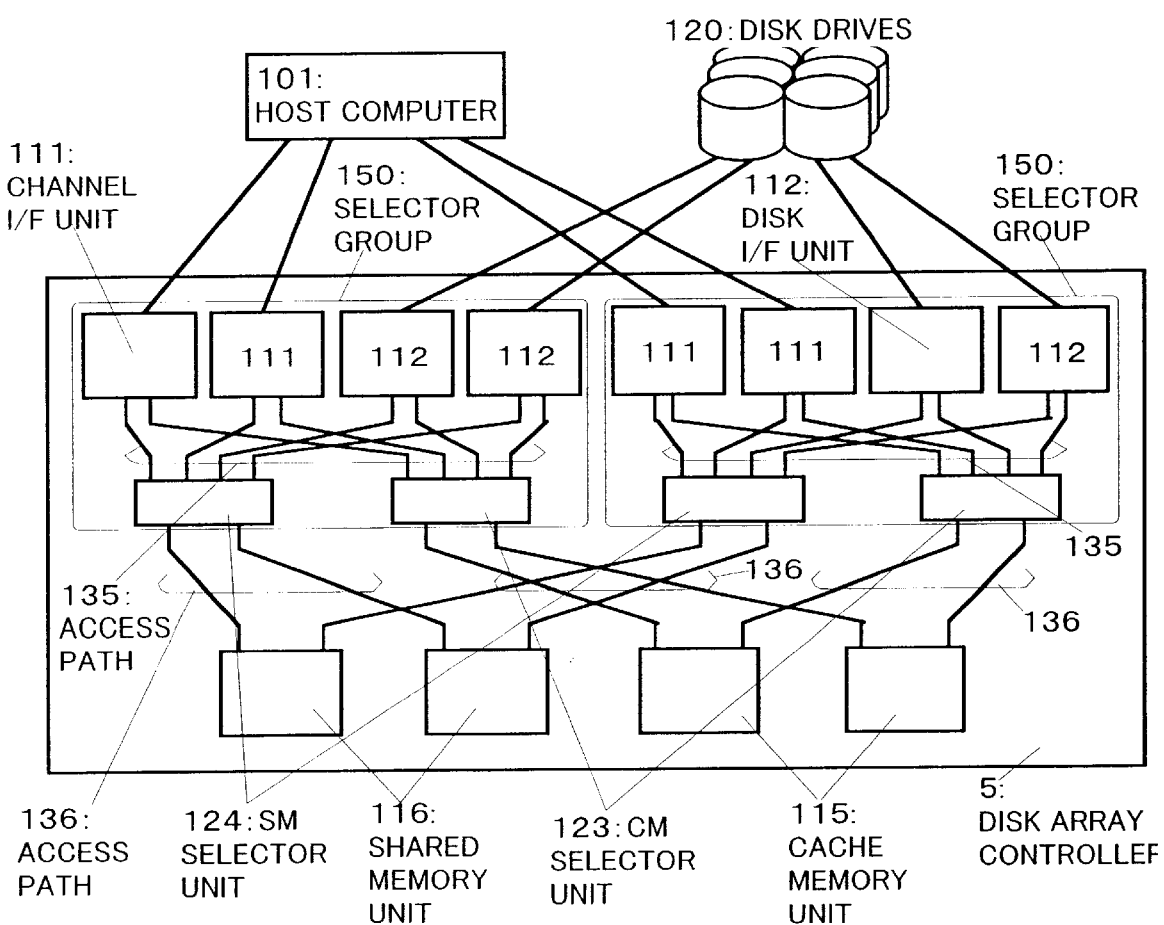
FIG. 10 is a block diagram showing the structure of another disk array controller of the invention.

The structure of the disk array controller shown in FIG. 1 is changed to that shown in FIG. 10. Namely, the shared memory unit 114 shown in FIG. 1 is physically divided into cache memory units 115 for temporarily storing data to be written in the disk drives 120 and shared memory units 116 for storing control information on the cache memory units 115 and a disk array controller 5, and a selector unit (CM selector unit) 123 connected to the cache memory units 115 and a selector unit (SM selector unit) 124 connected to the shared memory units are made physically independent. The structures of the selector units 123 and 124 are the same as the selector unit 113.

Access paths 135 and 136 between the channel I/F units 111 and disk I/F units 112 and the cache memory units 115 and shared memory units 114 are made physically independent, and at least the CM selector units 123 connected to the cache memory units 115 execute arbitration in the same manner as the process flow shown in FIG. 5. The reason why the SM selector units 124 do not execute arbitration is as follows. The control information on the cache memory units 115 and disk array controller 5 is stored in the shared memory units and has a small data amount. Therefore, it takes only a short time to use ports and these ports soon becomes vacant. As a result, even if arbitration is not executed, there is no practical problem.

Figure 11:
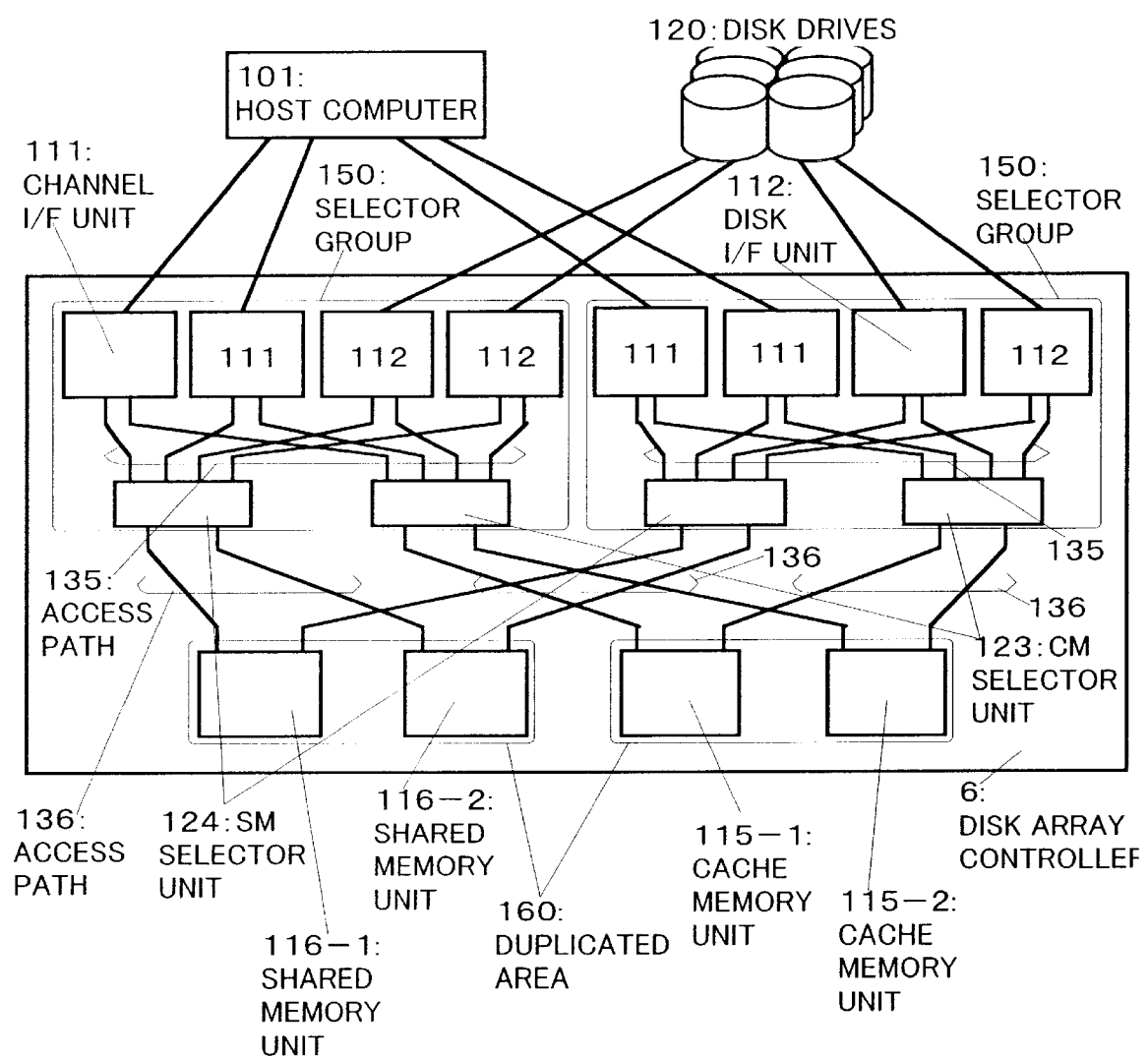
FIG. 11 is a block diagram showing the structure of another disk array controller of the invention.

In another embodiment, as shown in FIG. 11, a shared memory unit 116 and a cache memory unit 115 may be duplicated by using physically independent shared memory units 116-1 and 116-2 and cache memory units 115-1 and 115-2 to form duplicated areas 160. In this case, in a disk array controller 5 in which accesses (a duplicate access) from at least the CM selector unit 123 connected to the cache memory units to the duplicate cache memory units 115-1 and 115-2 are generated at the same time, it is checked at Steps 402 and 403 shown in FIG. 6 whether an access is a duplicate access. In the case of a duplicate access, if required two ports are vacant, these ports are assigned, whereas if not, the control advances to Step 406. These operations are performed by the CM selector units 123 connected to the cache memory units.

In this manner, reliability of data stored in the cash memory units 115-1 and 115-2 and shared memory units 116-1 and 116-2 can be improved. It is also possible to efficiently assign the I/F ports 211-1 and 211-2 to the cache memory units 115-1 and 115-2 when data to be written in the disk drives 120 is transferred.

Figure 7:
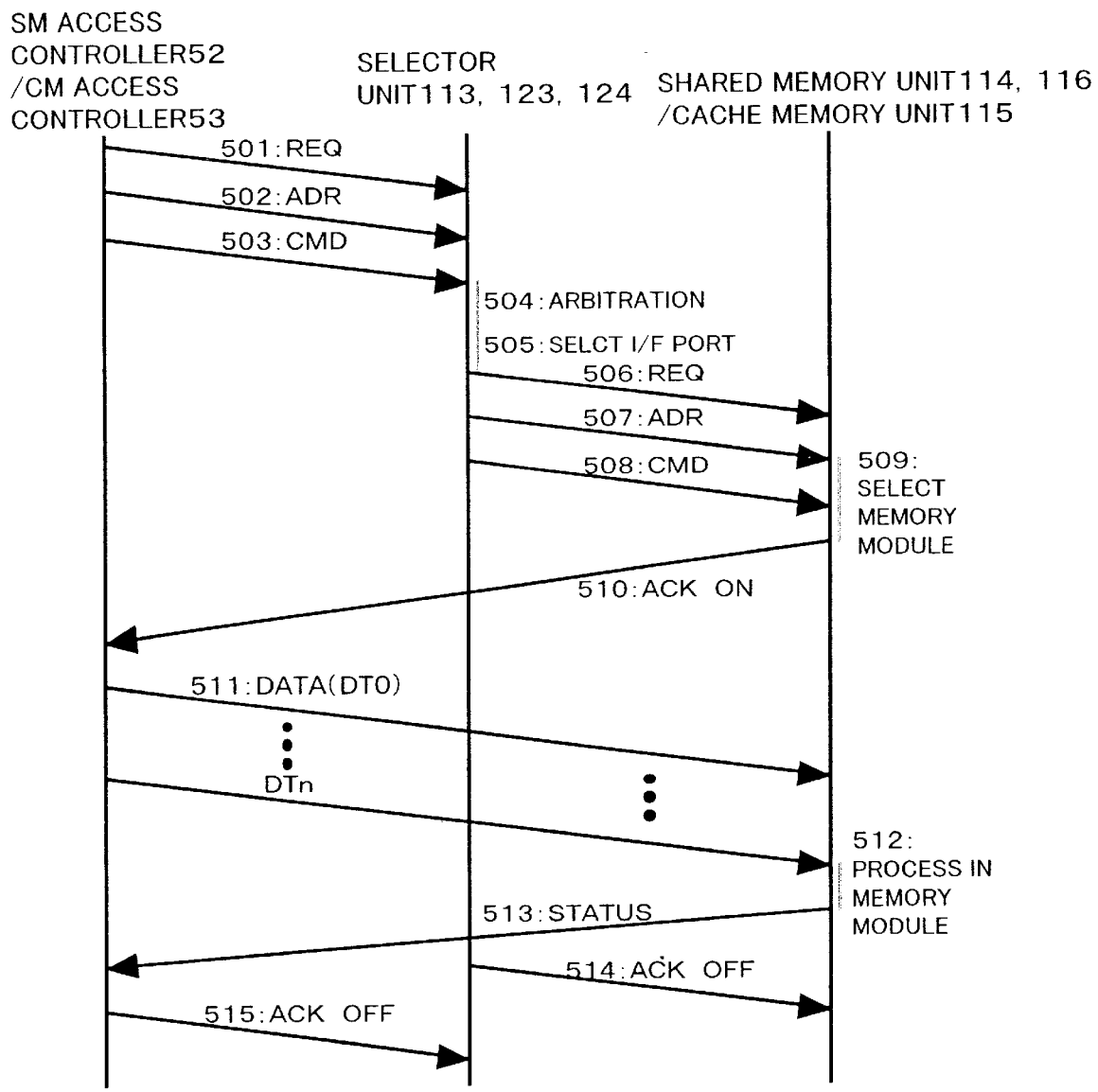
FIG. 7 is a sequence diagram illustrating data write into a shared memory unit or a cache memory unit.
Figure 8:
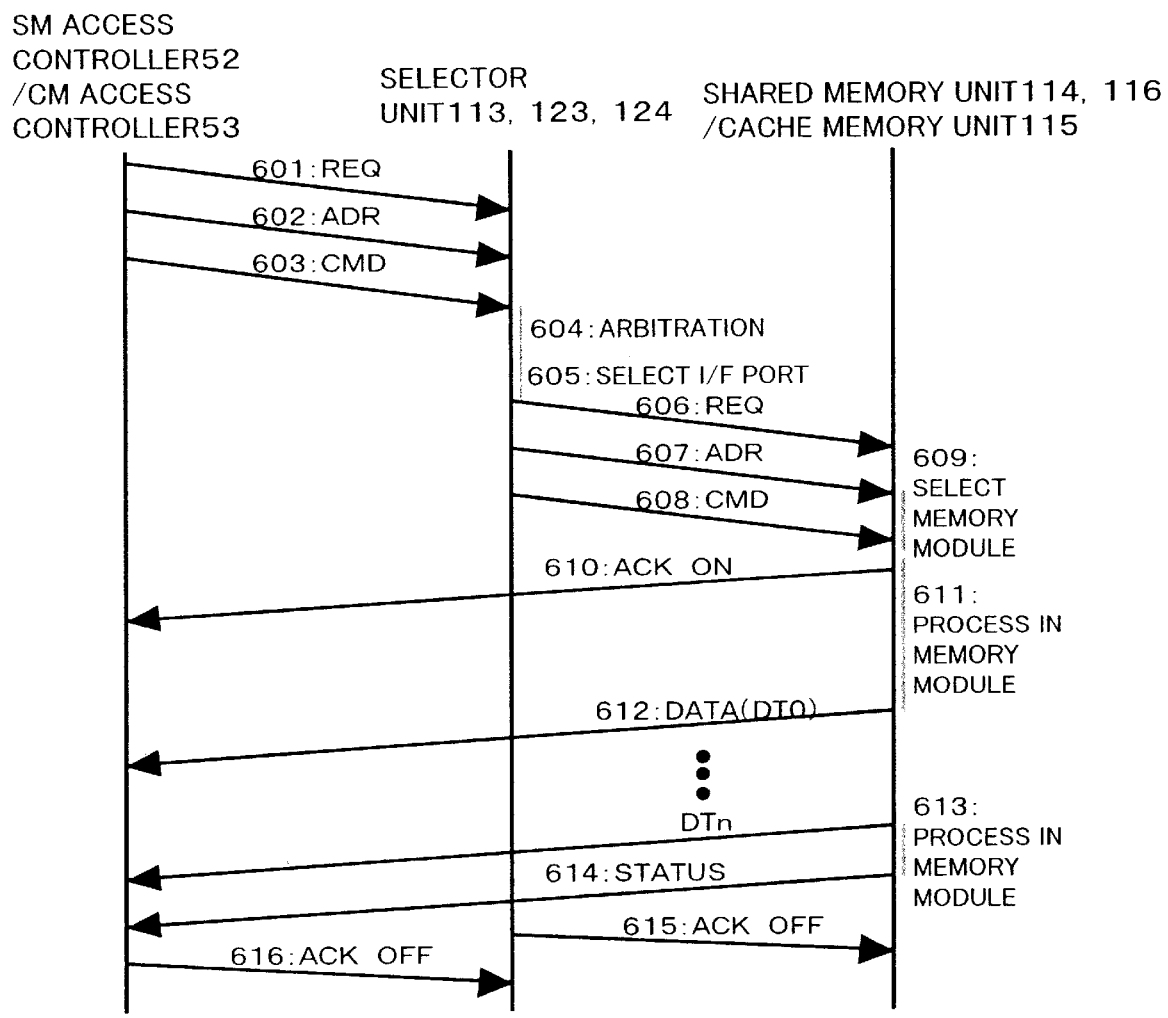
FIG. 8 is a sequence diagram illustrating data read from a shared memory unit or a cache memory unit.

FIGS. 7 and 8 are flow charts illustrating the details of the process flow shown in FIG. 5, and showing the data flow when the disk array controllers having the structures shown in FIGS. 1, 9, 10 and 11 operate.

For the data write as shown in FIG. 7, at Step 501 the SM or CM access controller 52 or 53 issues an access request (REQ) to the selector unit 113, 123 or 124, and then at Steps 502 and 503 an address (ADR) and a command (CMD) are transferred. In the following description, the selector unit 113, 123 or 124 is simply called a selector unit.

At Steps 504 and 505, the selector unit executes arbitration, and the selector 206 is switched to assign a port to the shared memory unit 114, 116 or cache memory unit 115.

At Step 506, the selector unit issues an access request (REQ) to the shared memory unit or cache memory unit, and then at Steps 507 and 508 an address (ADR) and a command (CMD) are transferred.

At Step 509 a memory module to be accessed is selected in the shared memory unit 114, 116 or cache memory unit 115, and thereafter at Step 510 an access acknowledgement (ACK ON) is returned via the selector unit to the SM or CM access controller 52, 53.

Upon reception of ACK ON, the SM or CM access controller 52, 53 sends data at Step 511.

Upon reception of all of the data, the shared memory unit 114, 116 or cache memory unit 115 executes a post-process at Step 512, and returns at Step 513 a STATUS to the SM or CM access controller 52, 53 via the selector unit.

Upon reception of the status, at Step 514 the selector unit instructs the shared memory unit 114, 116 or cache memory unit 115 to withdraw the access acknowledgement (ACK OFF).

Upon reception of the STATUS, at Step 515 the SM or CM access controller 52, 53 instructs the selector unit to withdraw the access acknowledgement (ACK OFF).

The data read process at Steps 601 to 610 is the same as the data write process at Steps 501 to 510 as shown in FIG. 8.

A data read pre-process is executed by the shared memory unit 114, 116 or cache memory unit 115 at Step 611.

At Step 612 data is transferred to the SM or CM access controller 52, 53 via the selector unit.

After data is transferred, the shared memory unit 114, 116 or cache memory unit 115 executes a post-process at Step 613. At Step 614 a STATUS is returned to the SM or CM access controller 52, 53 via the selector unit.

Upon reception of the STATUS, at Step 615 the selector unit instructs the shared memory unit 114, 116 or cache memory unit 115 to withdraw the access acknowledgement (ACK OFF).

Upon reception of the STATUS, at Step 616 the SM or CM access controller 52,53 instructs the selector unit to withdraw the access acknowledgement (ACK OFF).

As described above, when the channel I/F unit 111 or disk I/F unit 112 accesses the shared memory unit 114, 116 or cache memory unit 115, an address and a command are sequentially transferred and after an access path to the shared memory unit 114, 116 or cache memory unit 115 is established (step 510 or 610), data it transferred. It is therefore unnecessary for the selector unit to buffer transfer data. Therefore, the buffer 202 is not required, the control at the selector unit can be simplified, and throughput of accesses to the memory can be improved.

In each of the embodiments described above, although disk drives are connected, the invention is not limited only to disk drives but other drives for various types of disk media may also be used.

The invention is not limited only to the disclosed embodiments, but it includes various modifications which fall in the spirit and scope of appended claims.

What is claimed is:

1. A disk array controller comprising:
   a first interface unit to a host computer;
   a second interface unit to a plurality of disk drives;
   a cache memory unit for temporarily storing data to be stored in the disk drives or data stored in the disk drives; and
   a selector unit provided between said first and second interface units and said cache memory unit,
   wherein said selector unit comprises:
   a plurality of first ports to be connected to said first and second interface units;
   a plurality of second ports to be connected to said cache memory unit; and
   means for preferentially processing a connection request for a vacant port of the second ports, among a plurality of connection requests issued from said first and second interface units, if some of the second ports are occupied.

* * * * *